US007835273B2

United States Patent
Sin (10) Patent No.: US 7,835,273 B2
(45) Date of Patent: Nov. 16, 2010

(54) METHOD FOR TRANSMITTING DATA IN MOBILE AD HOC NETWORK AND NETWORK APPARATUS USING THE SAME

(75) Inventor: Jin-hyun Sin, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1420 days.

(21) Appl. No.: 11/133,369

(22) Filed: May 20, 2005

(65) Prior Publication Data

US 2005/0259577 A1    Nov. 24, 2005

(30) Foreign Application Priority Data

May 21, 2004    (KR)    .................. 10-2004-0036402

(51) Int. Cl.
G01R 31/08    (2006.01)
H04L 12/28    (2006.01)

(52) U.S. Cl. .................. 370/229; 370/235; 370/400

(58) Field of Classification Search .................. 370/229
See application file for complete search history.

(56) References Cited

U.S. PATENT DOCUMENTS 5,426,635 A    6/1995    Mitra et al.

2002/0068588 A1*    6/2002    Yoshida et al. .............. 455/461
2002/0145976 A1*    10/2002    Meyer et al. ................. 370/235

FOREIGN PATENT DOCUMENTS

| JP | 11-187031 A | 7/1999 |
|---|---|---|
| JP | 2000-209224 A | 7/2000 |
| KR | 10-0296077 A | 5/2001 |
| KR | 10-2002-0093543 A | 12/2002 |
| KR | 2003-0054981 A | 7/2003 |

* cited by examiner

Primary Examiner—Daniel J Ryman
Assistant Examiner—John Blanton
(74) Attorney, Agent, or Firm—Sughrue Mion, PLLC (57) ABSTRACT

Provided are a method for transmitting data in a mobile ad hoc network in which the quantity of data transmitted is adjusted by adjusting the size of a congestion window when network duplicate ACK packets are received, and a network apparatus using the same. The method includes mapping sequence numbers of data packets to be transmitted to congestion window sizes during transmission of the data packets, determining whether there is a lost data packet or not, and if there is a lost data packet, retransmitting the lost data packet and adjusting a congestion window size to the congestion window size mapped to the sequence number of the lost data packet. Accordingly, a data rate throughput over a wireless ad hoc network can be increased.

8 Claims, 7 Drawing Sheets

METHOD FOR TRANSMITTING DATA IN MOBILE AD HOC NETWORK AND NETWORK APPARATUS USING THE SAME

CROSS-REFERENCE TO RELATED APPLICATION

This application claims priority from Korean Patent Application No. 10-2004-0036402 filed on May 21, 2004 in the Korean Intellectual Property Office, the disclosure of which is incorporated herein by reference in its entirety.

BACKGROUND OF THE INVENTION

1. Field of the Invention

The present invention relates to a method for transmitting data in a mobile ad hoc network and a network apparatus using the same, and more particularly, to a method for transmitting data in a mobile ad hoc network in which the quantity of data transmitted is adjusted by adjusting the size of a congestion window when duplicate ACK packets are received, and a network apparatus using the same.

2. Description of the Related Art

Transmission Control Protocol (TCP) is a protocol used for transmission of data between nodes connected to a network together with IP (Internet Protocol). One of main functions of TCP is to transmit data in a secured manner over a network. To this end, TCP utilizes a congestion control mechanism. In the TCP congestion control mechanism, congestion occurring during data transmission is detected from a data packet loss to directly control a data throughput at a sender side and lost data packets are then retransmitted.

Figure 1:
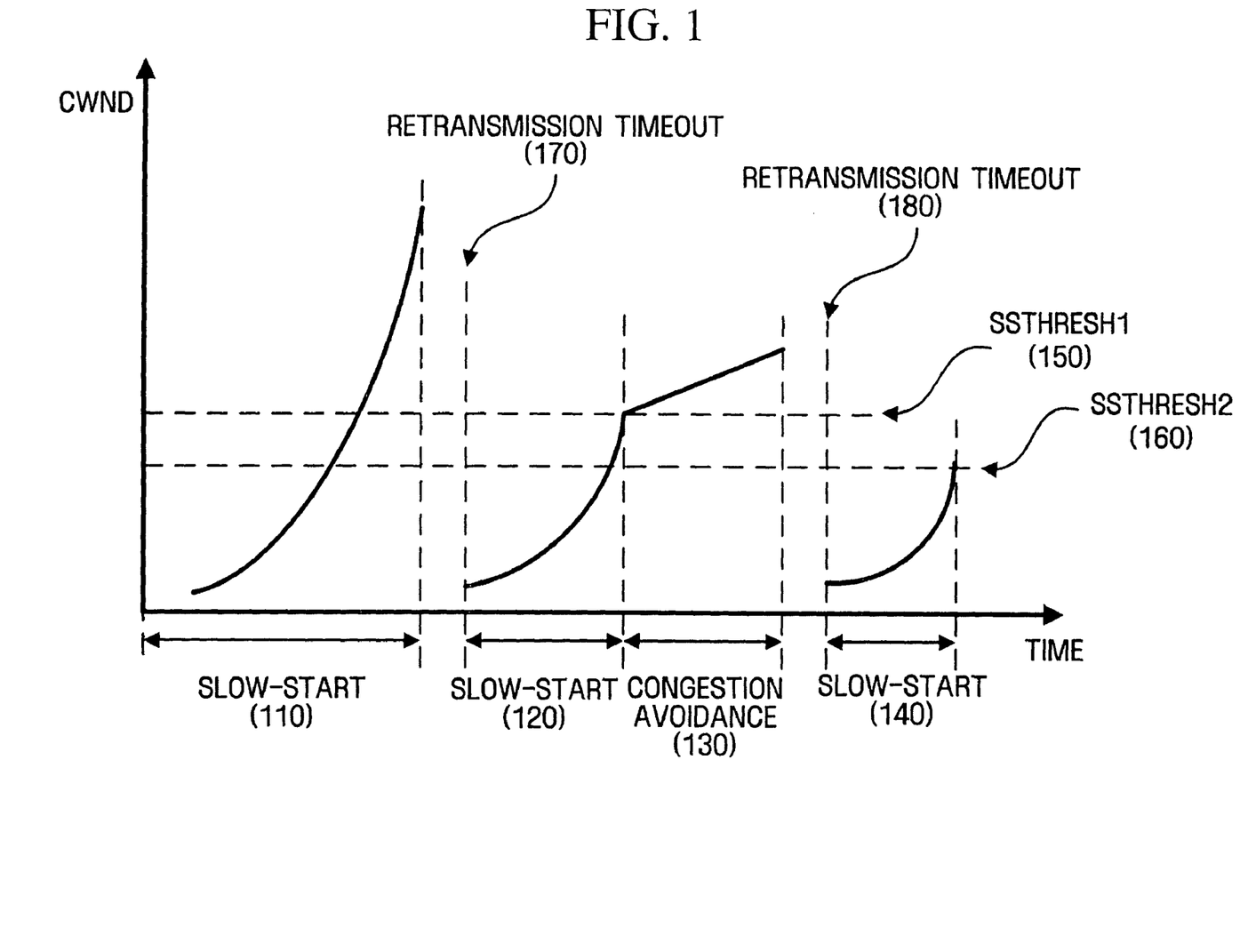
FIG. 1 is a diagram illustrating a change in the throughput according to a conventional Slow-Start/Congestion Avoidance algorithm.

FIG. 1 illustrates a change in the throughput depending on a conventional Slow-Start/Congestion Avoidance algorithm.

A congestion window (abbreviated as "CWND") size is initialized to one TCP segment at the time when the TCP of a sending network apparatus initiates transmission of data packets. The TCP segment is incremented by one (1) for every acknowledgement (ACK) packet received from a receiving network apparatus. Accordingly, the CWND size is increased exponentially, as labeled 110 in FIG. 1, which is called a slow-start algorithm.

However, if an ACK packet for the transmitted data packet is not received, the TCP waits for a retransmission timeout, labeled 170. If no ACK packet is received until the retransmission timeout 170 occurs, the TCP considers that congestion occurs in the network. In this case, the TCP sets a slow-start threshold (SSTHRESH) to a value SSTHRESH1, labeled 150, the value being a half the CWND size set immediately before the retransmission timeout. In addition, the TCP sets the CWND size to one (1) TCP segment and transmits data packets subsequently transmitted after the lost data packet using a slow-start algorithm, labeled 120.

If the CWND size reaches the SSTHRESH1 150 during transmission using the slow-start algorithm, the TCP performs transmission using a congestion avoidance algorithm, labeled 130, in which CWND is linearly increased, in consideration of congestion of the network. Thereafter, if no ACK packet is received once again and there occurs a retransmission timeout, labeled 180, the TCP sets the slow-start threshold (SSTHRESH) to a value SSTHRESH2, labeled 160, the value being a half the CWND size set immediately before occurrence of the retransmission timeout, sets the CWND size to 1 TCP segment, and a low-start algorithm, labeled 140, is started again.

In the slow-start/congestion avoidance algorithm, a retransmission timer is used in checking a retransmission timeout. Thus, when a data packet currently being transmitted is lost, the TCP has to wait for a retransmission timeout before retransmitting the lost data packet, resulting in a waste of network resources.

To address this problem, a fast retransmission/fast recovery algorithm has been proposed. In the slow-start/congestion avoidance algorithm, the reason for data packet loss is determined to be only a result of occurrence of a retransmission timeout. However, in the fast retransmission algorithm, it is determined that there is a data packet loss when a retransmission timeout occurs or a given number of a duplicate ACK packet is received even before the retransmission timeout occurs.

The duplicate ACK packet is generated by the TCP of the receiving network apparatus when the sequence of data packets transmitted by the transmitting network apparatus is different from the sequence of data packets received by the receiving network apparatus. The sequence of data packets can be verified by sequence numbers set in data packet headers.

Figure 2:
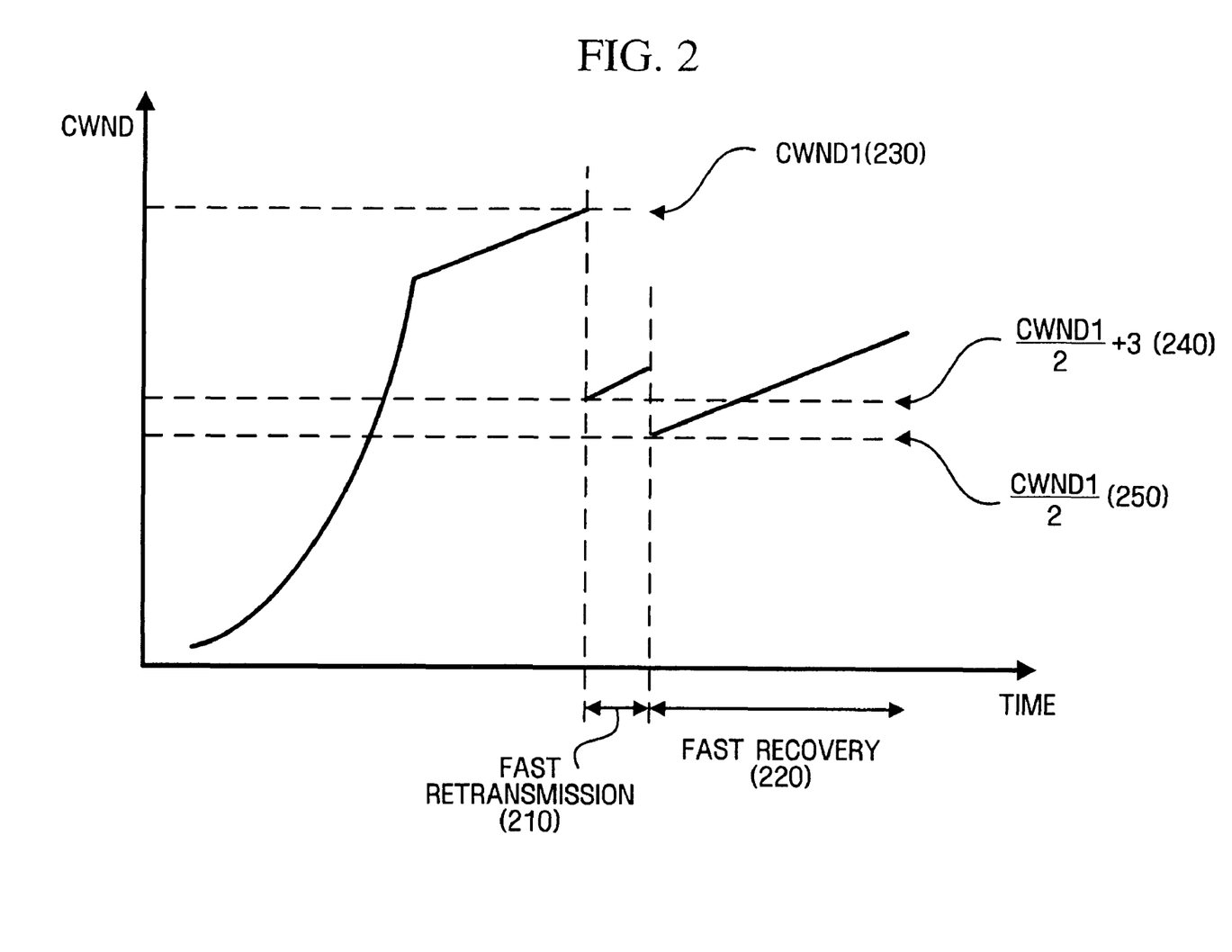
FIG. 2 is a diagram illustrating a change in the throughput according to a conventional congestion control algorithm using a fast retransmission and fast recovery algorithm.

FIG. 2 is a diagram illustrating a change in the throughput according to a conventional congestion control algorithm using a fast retransmission/fast recovery algorithm.

If the number of the same duplicate ACK packet received before occurrence of a retransmission timeout is greater than or equal to a predetermined number, the TCP based on a fast retransmission algorithm considers that a data packet is lost and retransmits the data packet considered as being lost using the fast retransmission algorithm, as labeled 210. When the fast retransmission algorithm is applied, the CWND size is set to a value (CWND1/2)+3, labeled 240, the value being 3 greater than a half the CWND size, i.e., CWND1, labeled 230, when a predetermined number of the duplicate ACK packet is received.

The number of the duplicate ACK packets received for a fast retransmission is typically 3. An explanation of the reason for this will follow. In a case that one or two duplicate ACK packets are received, it can be determined that the receipt of the one or two duplicate ACK packets is due to a difference between the receiver's data packet receiving sequence and the sender's data packet transmitting sequence, which results from different delays in a network, rather than due to a data packet loss.

While a fast recovery algorithm 220 is implemented, a lost data packet is retransmitted and then directly enters into a congestion avoidance process without passing through a slow-start process. To this end, the SSTHRESH value and the CWND size are set to a value CWND1/2, labeled 250, the value being a half the CWND size, i.e., CWND1, labeled 230, when a predetermined number of the duplicate ACK packets are received.

The TCP algorithm is proposed for a wired network in which a router has a considerably long queue and there are few errors in a link layer. However, a mobile ad hoc network has a considerably slow data transmission rate compared to the wired network and a very short queue in the link layer. Accordingly, in an event of a data packet loss in the mobile ad hoc wireless network, if a CWND size is sharply reduced, unnecessary consumption of network resources may be unavoidable.

For example, when a fast recovery algorithm is implemented, a reset CWND value is approximately a half the CWND value when 3 duplicate ACK packets are received. However, duplicate ACK packets may be continuously received, which means that even if one or two data packets are lost, other data packets are continuously being transmitted. That is, even if the current CWND sized is maintained, the transmission is performed within the maximum allowed bandwidth. Therefore, reducing the CWND size to a half the CWND size set when 3 duplicate ACK packets are received may result in waste of the maximum allowed bandwidth. Accordingly, there is a continuing need for improved data transmission methods for efficient utilization of network resources.

SUMMARY OF THE INVENTION

The present invention provides an improved data transmission method in which a throughput in data transmission can be increased by adjusting a CWND size set after retransmitting a lost data packet to an initial CWND size set when the lost data packet was first transmitted, in a case where a data packet loss is determined from duplicate ACK packets received.

The above stated object as well as other objects, features and advantages, of the present invention will become clear to those skilled in the art upon review of the following description, the attached drawings and appended claims.

According to an aspect of the present invention, there is provided a method for transmitting data including mapping sequence numbers of transmitted data packets to congestion window sizes during transmission of the data packets, determining whether there is a lost data packet among the transmitted data packets or not, and if it is determined that there is a lost data packet, retransmitting the lost data packet and adjusting the congestion window size to that mapped to the sequence number of the lost data packet.

According to another aspect of the present invention, there is provided a network apparatus including a mapping unit mapping sequence numbers of transmitted data packets to congestion window sizes during transmission of the data packets, a controller retransmitting the lost data packet and adjusting the congestion window size to that mapped to the sequence number of the lost data packet if it is determined that there is a lost data packet, and a transceiver transmitting the data packet and receiving an acknowledgement (ACK) packet corresponding to the data packet.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of this invention are shown.

Figure 3:
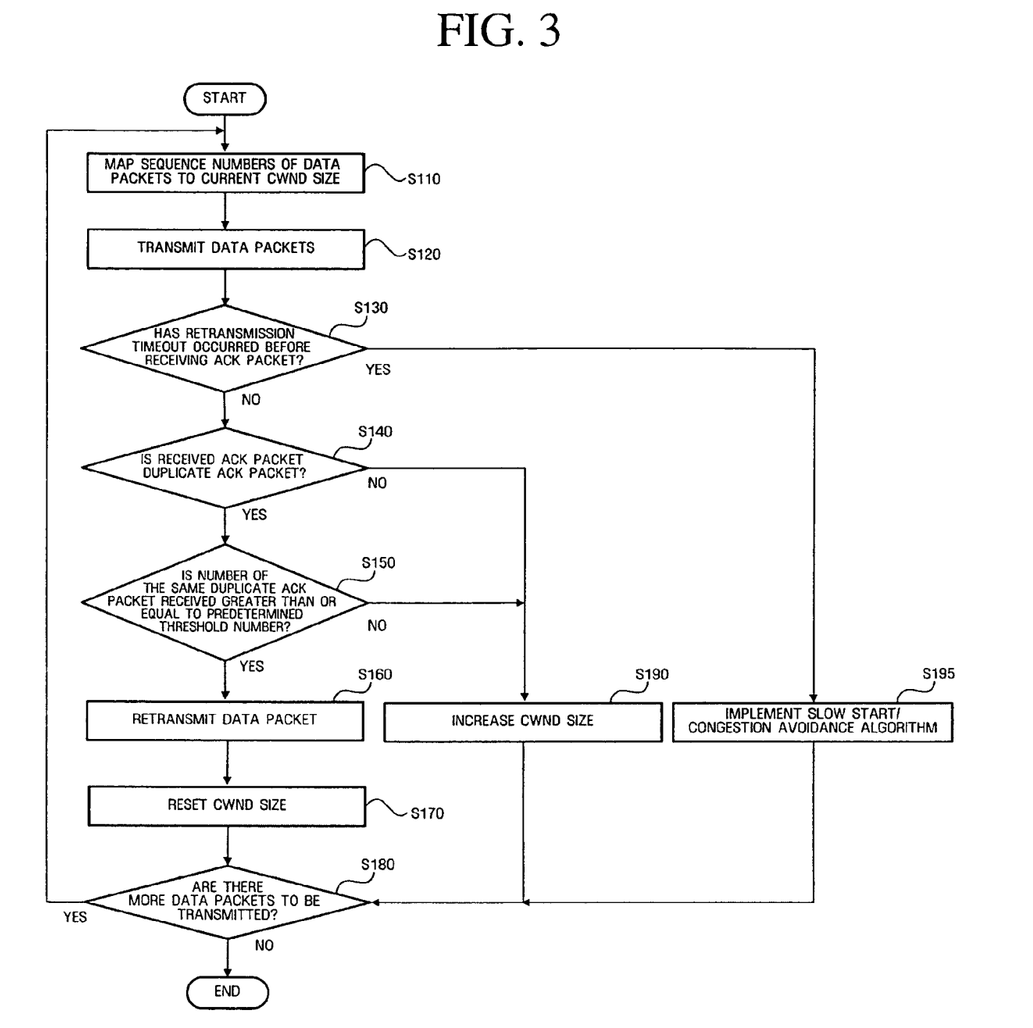
FIG. 3 is a flowchart illustrating a method for transmitting data in a mobile ad hoc network according to an exemplary embodiment of the present invention.

FIG. 3 is a flowchart illustrating a method for transmitting data in a mobile ad hoc network according to an exemplary embodiment of the present invention.

In operation S110, a network apparatus that intends to transmit data packets maps sequence numbers of the data packets to a current CWND size.

Then, the network apparatus transmits the respective data packets in operation S120.

In order to control transmission of data packets, the TCP employs a concept known as a "window." If data packets to be transmitted are stored in a buffer, the data packets within a window size are simultaneously transmitted. The size of a window can be adjusted by varying the size of a congestion window. A sliding window approach may be employed. In the sliding window approach, whenever an ACK packet is received, the window slides along the sequence of the packets.

As described above, transmission of data packets can be made in units of data packets within a window. Accordingly, all of the data packets within the window can be continuously transmitted before receiving an ACK packet.

In a case where a data packet transmitted by the network apparatus arrives safely at a destination, the network apparatus can receive an ACK packet for the transmitted data packet. However, if the network apparatus is in a congestion state, before receiving the ACK packet, the network apparatus may have an occurrence of a transmission timeout. Thus, in operation S130, the network apparatus determines whether the retransmission timeout occurs or not. If the retransmission timeout occurs, the throughput for the data transmission can be adjusted using the conventional slow-start/congestion avoidance algorithm in operation S195.

However, if an ACK packet is received before occurrence of a retransmission timeout, the network apparatus determines whether the received ACK packet is a duplicate ACK packet or not, in operation S140.

If the received ACK packet is not a duplicate ACK packet, the CWND size can be increased in the same manner as in the conventional method in operation S190. For example, when a slow-start algorithm is implemented for adjusting the current CWND size, the CWND size can be exponentially increased. When a congestion avoidance algorithm is currently operated, the CWND size can be linearly increased.

In operation S180, it is determined whether there are more data packets to be transmitted after increasing the CWND size. If there are more data packets to be transmitted, the window moves to transmit the next data packets. In this case, the network apparatus may repeat the operation S110 and the following operations while mapping sequence numbers of data packets to be transmitted next to the current CWND size (the CWND size increased in operation S190).

Meanwhile, if the received ACK packet is determined as a duplicate ACK packet in operation S140, the network apparatus determines whether the number of the same duplicate ACK packet received is greater than or equal to a threshold number in operation S150. To determine whether there is a data packet loss or not in accordance with the fast retransmission algorithm like in the prior art, the same duplicate ACK packet is received 3 times. Thus, the threshold number in operation S150 is preferably three (3).

If the number of duplicate ACK packets received is less than the threshold number, occurrence of the duplicate ACK packet may be determined to be caused by a difference between the receiver's data packet receiving sequence and the sender's data packet transmitting sequence, which results from different delays in the network, rather than being due to a data packet loss. In this case, the network apparatus determines that no data packet is lost. Thus, the CWND size can be increased in operation S190 like in the case where no duplicate ACK packet is received.

On the other hand, if the number of duplicate ACK packets is greater than or equal to the threshold number, occurrence of the duplicate ACK packet may be determined to be caused by a data packet loss. In this case, the network apparatus retransmits a lost data packet estimated from the duplicate ACK packet in operation S160.

When retransmitting the data packet, the network apparatus may reset the CWND size to the CWND size mapped to the sequence number of the lost data packet in operation S170.

Thereafter, in operation S180, it is determined whether there are more data packets to be transmitted. If yes, the window moves for transmission of next data packets. The operations following after operation S110 may be repeatedly performed.

As described above, a data packet loss is detected from a duplicate ACK packet to then retransmit the lost data packet and a CWND size is reset in operation S170. Thereafter, in transmitting the remaining data packets, the network apparatus may linearly increase the CWND size in the same manner as in a case of using the congestion avoidance algorithm. To this end, when the CWND size is reset in operation S170, the SSTHRESH value can be set to a level being not less than the reset CWND size.

Figure 4:
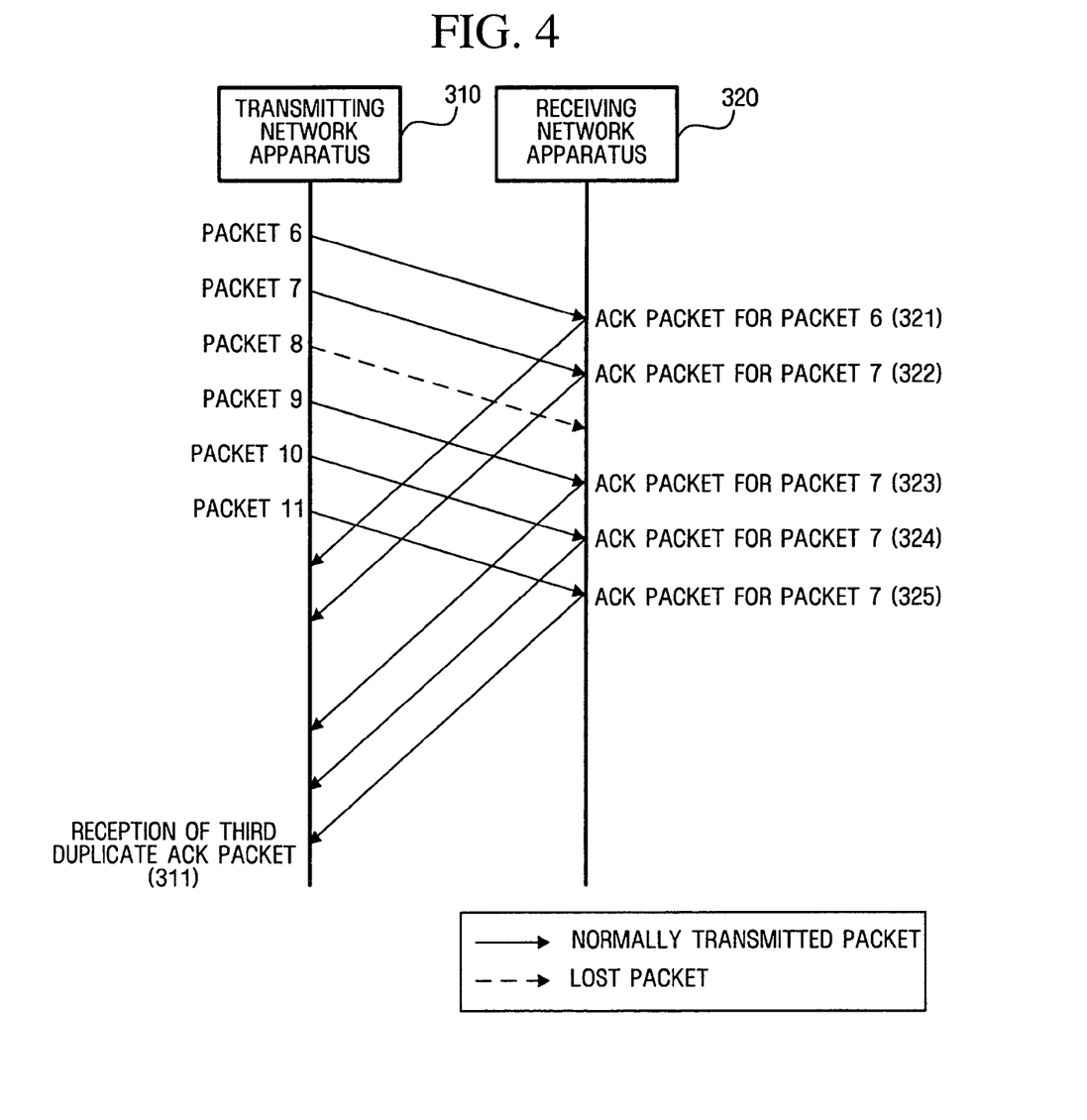
FIG. 4 illustrates transmission of data packets and reception of ACK packets.

FIG. 4 illustrates transmission of data packets and reception of ACK packets.

As shown in FIG. 4, when a transmitting network apparatus 310 transmits a data packet, a receiving network apparatus 320 transmits an ACK packet for the data packet transmitted from the transmitting network apparatus 310. According to an exemplary embodiment of the present invention, whenever each data packet is transmitted, the transmitting network apparatus 310 maps a sequence number of the data packet to a CWND size set when transmitting the data packet.

In the illustrative exemplary embodiment, a packet 6 and a packet 7 are normally transmitted to the receiving network apparatus 320. Accordingly, the receiving network apparatus 320 transmits ACK packets 321 and 322 for the packet 6 and the packet 7, respectively. Whenever each ACK packet is received from the receiving network apparatus 320, the transmitting network apparatus 310 may increase the CWND size.

Meanwhile, if a packet 8 among data packets transmitted is lost, as shown in FIG. 4, the receiving network apparatus 320, which has not received the packet 8, does not transmit an ACK packet for the packet 8. In this case, even if packets 9-11 are received later, the receiving network apparatus 320 duplicates an ACK packet for the packet 7 to then transmit the same to the transmitting network apparatus 310, as labeled 323 through 325. If the threshold number is set to 3 in operation S150, the transmitting network apparatus 310 determines that the packet 8 is lost when the third duplicate ACK packet 326 for the packet 7 is received, as labeled 311.

If the packet 8 is determined as a lost packet, the transmitting network apparatus 310 retransmits the packet 8 and resets the CWND size to the same CWND size as that mapped to the sequence number of the packet 8.

Figure 5:
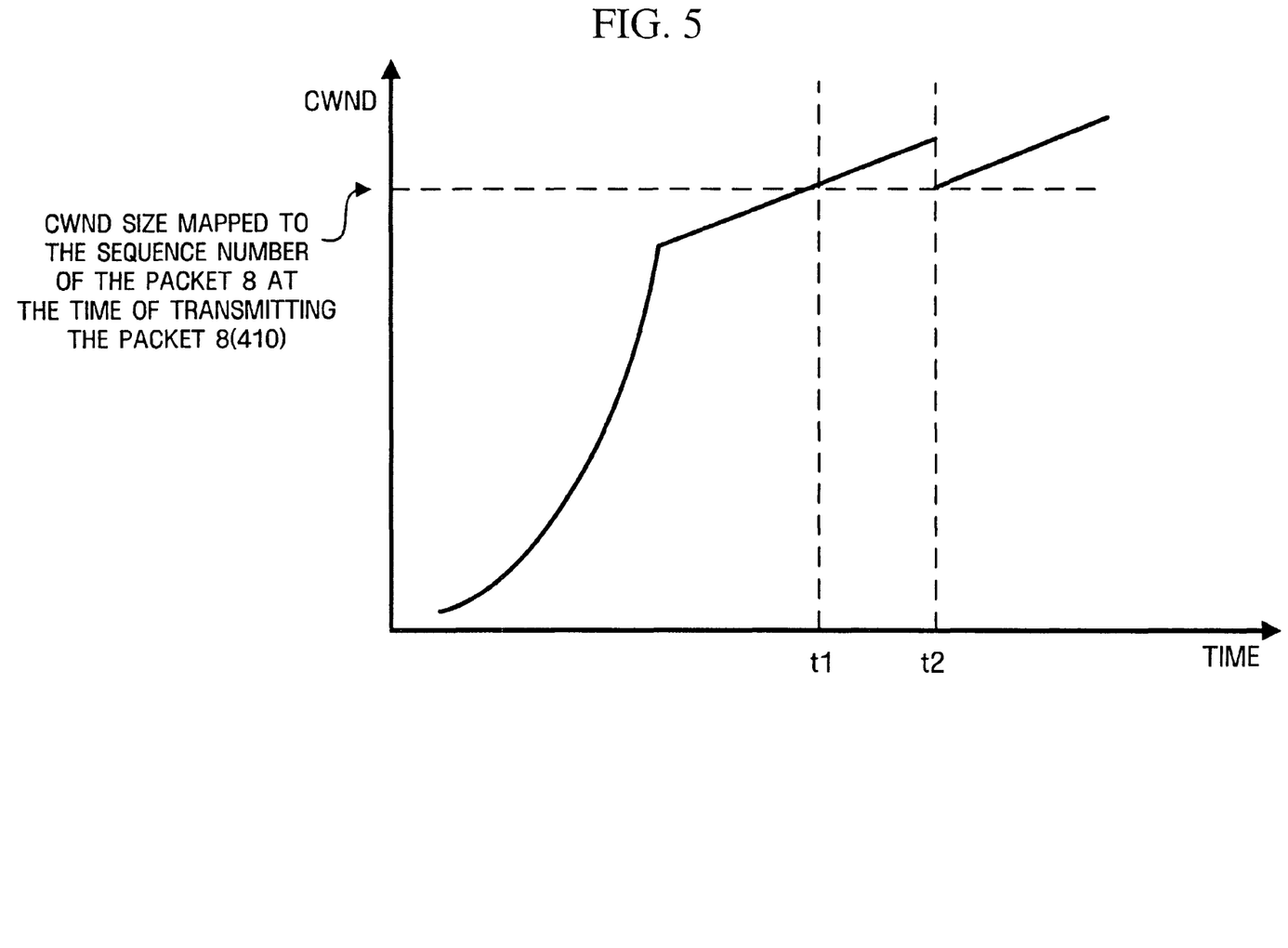
FIG. 5 is a diagram illustrating a change in the throughput according to an exemplary embodiment of the present invention.

FIG. 5 is a diagram illustrating a change in the throughput of data transmission according to the present invention.

Whenever each data packet is transmitted, a transmitting network apparatus maps a sequence number of the data packet to a CWND size set when transmitting the data packet. On receipt of an ACK packet for the transmitted data packet, the transmitting network apparatus may increase the CWND size.

If the data packet 8 shown in FIG. 4 is transmitted at a time t1 and the third duplicate ACK packet for the packet 7 is received at a time t2, as labeled 311, the transmitting network apparatus can determine at the time t2 that the packet 8 is lost. Since the packet 8 is lost, the transmitting network apparatus retransmits the packet 8. In addition, the transmitting network apparatus may set the CWND size to the same CWND size, labeled 410, as that mapped to the sequence number of the packet 8 at the time of transmitting the packet 8.

Thereafter, whenever each ACK packet is received, the CWND size can be increased again. To linearly increase the CWND size, the SSTHRESH value can be set to the CWND size 410 mapped to the sequence number of the packet 8. Otherwise, the SSTHRESH value can be set to a value smaller than the CWND size 410 mapped to the sequence number of the packet 8. Accordingly, the CWND size set after the time t2 can be increased linearly whenever each ACK packet is received.

Figure 6:
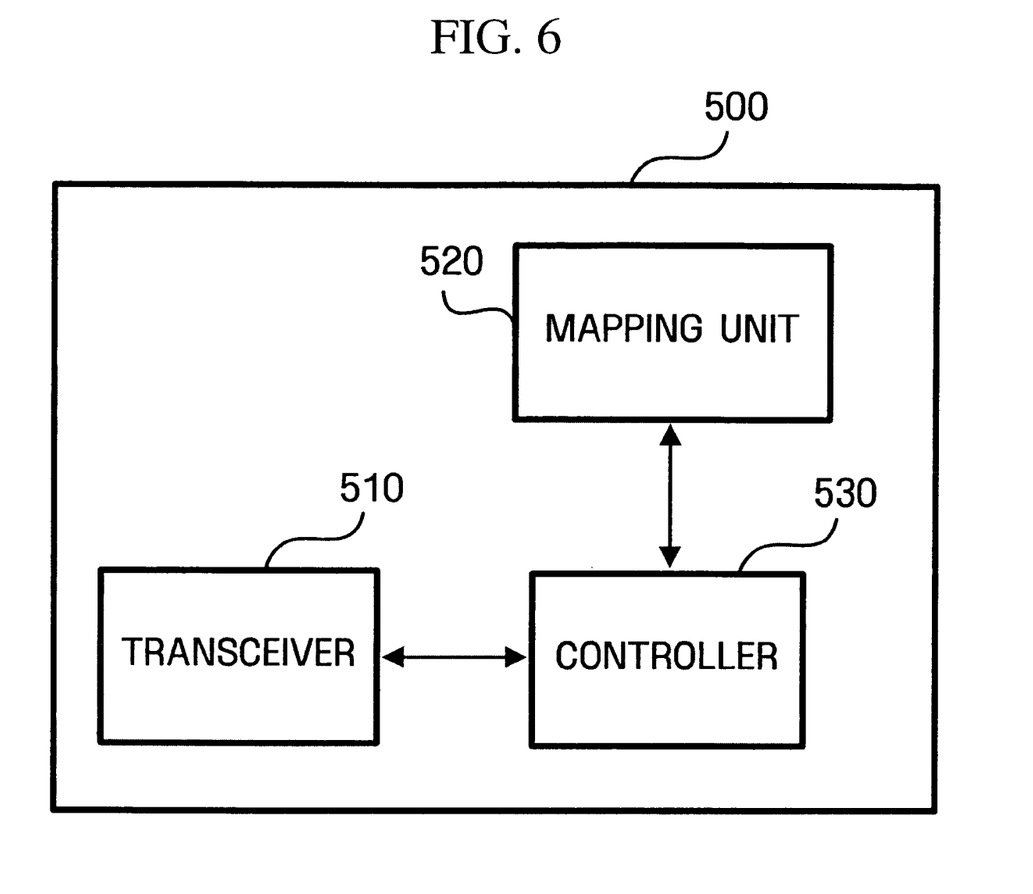
FIG. 6 is a block diagram of a network apparatus according to an exemplary embodiment of the present invention.

FIG. 6 is a block diagram of a network apparatus 500 according to the present invention.

Referring to FIG. 6, the network apparatus 500 includes a transceiver 510, a controller 530, and a mapping unit 520. The transceiver 510 transmits a data packet and receives an ACK packet for the transmitted data packet. The controller 530 determines whether there is a lost data packet or not, retransmits the lost data packet and adjusts the CWND size accordingly. The mapping unit 520 maps a sequence number of the data packet to the corresponding CWND size set when transmitting the data packet.

In more detail, in addition to transmitting a data packet to a destination and receiving an ACK packet for the transmitted data packet, the transceiver 510 may have a function of receiving data packets transmitted from another network apparatus. The transceiver 510 enables data transmission and reception in a wireless network environment and may be configured to be operable in the IEEE 802.11, Bluetooth, or IEEE 1394 network according to corresponding wireless network standards for each network configuration.

The mapping unit 520 maps the sequence number of each data packet to the corresponding CWND size set when transmitting the data packet whenever the data packet is transmitted.

The controller 530 determines whether the transmitted data packet is lost or not. The determination is made such that a retransmission timer is actuated whenever each data packet is transmitted, and the corresponding data packet is determined as a lost one when an ACK packet for the data packet is not received until the timer expires.

In addition, even if the retransmission timer is not expired, a data packet loss can be detected from the number of the same duplicate ACK packet received. That is, if the same duplicate ACK packet is received by a predetermined threshold number, the controller 530 determines a data packet loss from the received duplicate ACK packet. Here, the predetermined threshold number is preferably three.

Meanwhile, if the transmitted data packet is determined as a lost one, the controller 530 reduces the CWND size to make the amount of data transmitted not exceed the maximum allowed bandwidth in the current wireless network.

In this case, if the determination of the data packet loss is based on the expiration of a retransmission timer, the controller 530 can adjust the CWND size using the conventional slow-start/congestion avoidance algorithm. That is, in a state in which an ACK packet is not received, the retransmission timer expires, or a retransmission timeout occurs, the CWND size can be set to 1 TCP segment.

However, if the determination of the data packet loss is based on the reception of the same duplicate ACK packet by a predetermined threshold number, the controller 530 retransmits the data packet considered as being lost and reduces the CWND size to that mapped to the sequence number of the lost data packet.

Thereafter, while transmitting data packets on the basis of the reduced CWND size, the CWND size can be gradually increased. Here, to linearly increase the CWND size, the controller 530 may set the SSTHRESH value to the CWND size mapped to the sequence number of the lost data packet. In addition, the SSTHRESH may be set to a value smaller than the CWND size mapped to the sequence number of the lost data packet.

The fact that multiple duplicate ACK packets have been continuously received means that data packets transmitted after the lost data packet are normally transmitted to the receiving network apparatus, suggesting the current data transmission amount is not beyond the maximum allowed bandwidth. Therefore, by adjusting a new CWND size to the corresponding CWND size of the lost data packet, the wasting of network resources is reduced.

Figure 7:
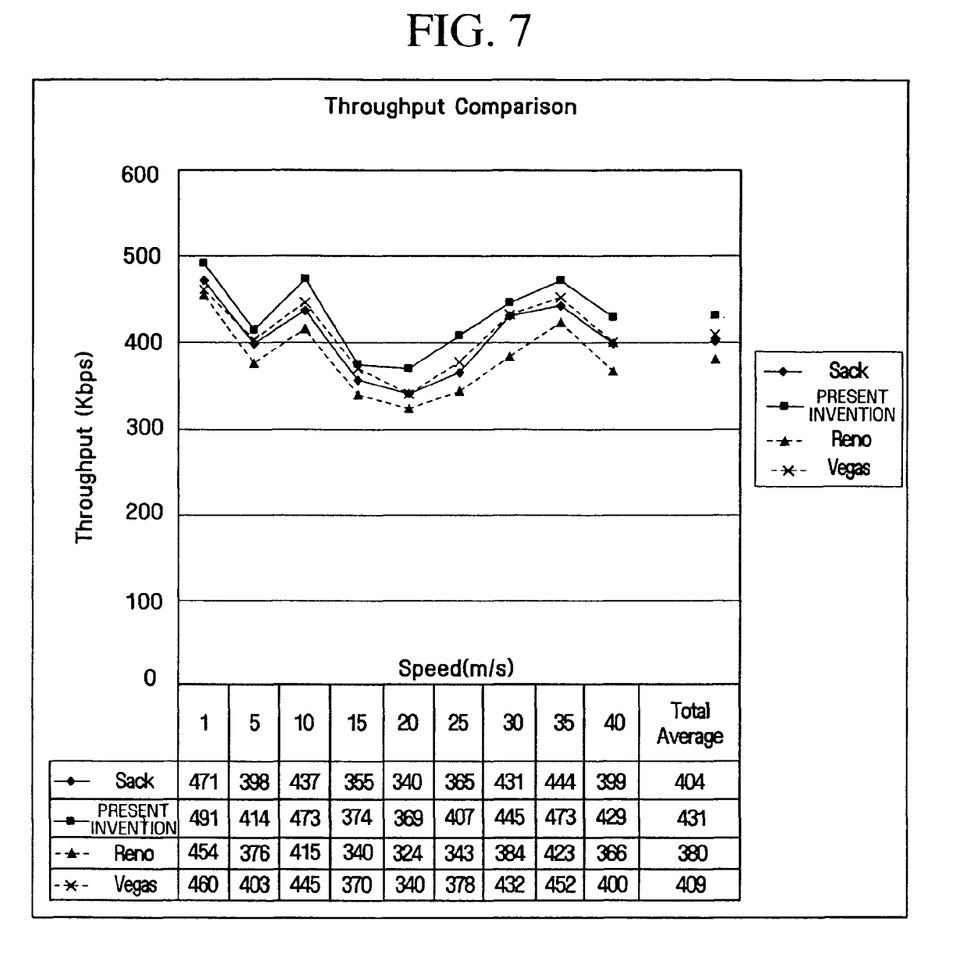
FIG. 7 is a graph illustrating simulation results of throughputs in the data transmission method according to an exemplary embodiment of the present invention and the conventional the data transmission method.

FIG. 7 is a graph illustrating simulation results of throughputs in the data transmission method according to an exemplary embodiment of the present invention and in the conventional transmission methods.

In FIG. 7, the x-axis indicates moving speeds of mobile devices for transmitting and receiving data, and the y-axis indicates throughputs.

For comparison of network performance parameters of the present invention, TCP Reno version, TCP Vegas version and TCP SACK version simulations were conducted using a Network Simulator Version 2 (NS2).

The simulation results shown in FIG. 7 shows that the present invention significantly enhanced a TCP data rate throughput. That is, the throughput of the data transmission method according to the present invention is approximately 11% better than the TCP Reno version and approximately 5% better than TCP SACK version.

According to the method of transmitting data of the present invention and the network apparatus using the method, the throughput over a wireless ad hoc network can be increased.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A method for transmitting data comprising:
mapping sequence numbers of data packets to be transmitted to congestion window sizes during transmission of the data packets;
determining whether there is a lost data packet among the transmitted data packets or not; and
if there is the lost data packet, retransmitting the lost data packet and adjusting a congestion window size to the congestion window size mapped to the sequence number of the lost data packet.

2. The method of claim 1, wherein the determining comprises determining whether a number of duplicate ACK packets received is greater than or equal to a predetermined threshold number.

3. The method of claim 2, further comprising setting a slow-start threshold to be equal to the congestion window size mapped to the sequence number of the lost data packet.

4. The method of claim 1, wherein the congestion window size for transmission of the data packets is increased if ACK packets corresponding to successful transmission of the data packets is received.

5. A network apparatus comprising:
a mapping processor mapping sequence numbers of data packets to be transmitted to congestion window sizes during transmission of the data packets;
a controller, if there is a lost data packet, retransmitting the lost data packet and adjusting a congestion window size to the congestion window size mapped to the sequence number of the lost data packet; and
a transceiver transmitting the data packets and receiving an acknowledgement (ACK) packet corresponding to the data packet.

6. The network apparatus of claim 5, wherein the controller determines that there is the lost data packet if a number of duplicate ACK packets received is greater than or equal to a predetermined threshold number.

7. The network apparatus of claim 6, wherein the controller sets a slow-start threshold to be equal to the congestion window size mapped to the sequence number of the lost data packet.

8. The network apparatus of claim 5, wherein the congestion window size for transmission of the data packets is increased if the ACK packet corresponding to successful transmission of the data packet is received by the transceiver.

* * * * *